United States Patent
Kempton William G.

[11] 3,764,104
[45] Oct. 9, 1973

[54] EXPANSION COMPENSATING DISPENSING VALVE

[76] Inventor: William G. Kempton, 1855 Sherington Pl., No. M106, Newport Beach, Calif.

[22] Filed: Mar. 15, 1971

[21] Appl. No.: 124,006

[52] U.S. Cl. .............................................. 251/357
[51] Int. Cl. ............................................. F16k 51/00
[58] Field of Search ................... 251/357, 318, 347, 251/141; 137/434; 222/402.24

[56] References Cited
UNITED STATES PATENTS

| | | | |
|---|---|---|---|
| 2,887,126 | 5/1959 | Frantz | 251/357 X |
| 2,790,458 | 4/1957 | Kalert, Jr. | 137/434 X |
| 2,890,711 | 6/1959 | Parker | 137/434 |
| 3,471,123 | 10/1969 | Carlson et al | 137/434 X |
| 3,625,245 | 12/1971 | Biermann | 251/357 X |
| 1,662,291 | 3/1928 | Bastian | 251/357 X |
| 2,136,940 | 11/1938 | Ehbrecht | 251/357 X |
| 3,054,594 | 9/1962 | Hecht | 137/434 X |
| 3,236,496 | 2/1966 | Rosenstein et al | 251/357 |
| 3,306,570 | 2/1967 | Cooksley | 251/357 X |
| 3,670,274 | 6/1972 | Ellison | 251/141 X |

Primary Examiner—Samuel Scott
Attorney—Newton H. Lee, Jr.

[57] ABSTRACT

A dispensing valve including a valve head engageable with an annular seat which circumscribes a flow passage, in which the head has an elastomeric central valve seat engaging section of circular configuration, the central section extending over an expansion cavity. An aerosol dispenser including a pair of such valves for dispensing measured from from a container.

4 Claims, 2 Drawing Figures

Patented Oct. 9, 1973                      3,764,104

INVENTOR.
WILLIAM G. KEMPTON
BY Newton H. Lee, Jr.

3,764,104

EXPANSION COMPENSATING DISPENSING VALVE

BACKGROUND OF THE INVENTION

Valve members often include a sealing element made of a resilient elastomeric material such as synthetic or natural rubber and it has been found that such materials are sometimes caused to swell by the fluid whose flow the valve controls. This is true of fluid propellants, such as Freon 11 and 12, which are used in aerosols, and this has caused problems in the use of rubber or other resilient sealing elements in valve members which are to control the flow of mixtures including such propellants. The problem is particularly acute when the movement of the valve member between closing and opening the valve is small since the rubber may, in time, swell sufficiently to obstruct flow even when the valve member is moved away from the valve seat to its maximum extent.

It is not possible with known rubber completely to eliminate this swelling, and the present invention is intended to reduce the effect of such swelling in a valve member.

SUMMARY OF THE INVENTION

Viewed from one aspect, the present invention provides a valve including a valve member and a valve seat, the valve member comprising a body carrying a resilient seating element having a sealing face adapted to engage the valve seat to close the valve to passage of a fluid in use, the said sealing element, or at least the part thereof on which the said sealing face is defined, being of limited thickness normal to the sealing face, and a space being provided behind the sealing face part of the element so that, when the liquid whose flow is controlled is of a kind which causes swelling of the sealing element material, such swelling will take place partly into said space and thus away from the sealing face of the element.

Preferably, the said sealing element, or at least the part thereof in which the said sealing face is defined, is of a configuration having a thickness (normal to said sealing face) substantially less than its breadth, i.e., of substantially plate-like or plug-like configuration.

The scope of the invention also extends to the provision of a valve member alone and thus, viewed from another aspect, the invention provides a valve member comprising a body carrying a resilient sealing element of substantially plug-like configuration having an outwardly facing sealing face for sealing against a valve seat in use, said sealing element being secured around its periphery to the said body and a cavity being defined at the inwardly facing rear face of the sealing element to accommodate swelling of the sealing element rearwardly away from its said sealing face.

It will be understood that the invention reduces the propensity for swelling of the sealing element at its sealing face, by permitting it to swell rearwardly. Furthermore, by making the element, or at least the sealing face region thereof, of comparatively thin, substantially plate-like, form, the quantity of material is reduced so that the amount of swelling is reduced.

Preferably, the whole of the sealing element is in the form of a disc, and in this case the body of the valve member may include a ring portion surrounding and gripping such element, the sealing and rear faces of the sealing element being disposed on opposite sides of the ring portion. In the latter case, it is preferred to mold the sealing element in the said ring portion, so as to eliminate the need for any bonding agent which might also be sensitive in some way to the fluid whose flow is to be controlled. To reduce the possibility of tearing or damaging the sealing element, the ring portion may be formed so as to have a bevelled inner edge facing the valve seat.

Such a ring portion may take the form of a separate ring carried in a socket formed in the body of the valve member, a depression being formed in the floor of the socket to allow the sealing element to swell rearwardly.

Preferably, the said ring portion grips the sealing element around a part thereof which is substantially spaced rearwardly from the plane of its sealing face so as to permit some swelling of the element to occur laterally, i.e., in directions parallel to its sealing face; it will be understood that any added facility for swelling of the sealing element to occur other than at and normal to its sealing face is advantageous.

The scope of the invention extends to valves and valve members incorporating two sealing elements carried by a single body and engageable one at a time with respective valve seats which are oppositely disposed so as to be alternately opened and closed to control the flow of pressurized fluid through a closed chamber housing the valve body, a space being defined between the inner wall of the chamber and the said body so that fluid can enter the chamber under pressure via one flow passage defined by one of the valve seats and leave via another flow passage defined by the other, when said flow passage is connected to the outlet of an aerosol can and the other flow passage is connected to an outlet nozzle.

The said body is preferably made of magnetizable material and the chamber surrounded by a solenoid coil, movement of the body and the consequent release of a quantity of fluid being effected by energizing the solenoid coil. This energization is controlled by a time switch, so that the predetermined quantity of fluid may be released at set intervals which are preferably variable.

Thus, viewed from another aspect the invention provides apparatus for automatically and successively delivering metered quantities of fluid from an aerosol container, comprising a chamber having an inlet to which fluid is supplied from such a container and having an outlet to the exterior of the apparatus, valve seats within the chamber surrounding the inlet and outlet passages, respectively, a valve member movable within the chamber and provided with respective sealing elements as set forth hereinbefore to engage one at a time with the respective valve seats, so as to, in a first position of the valve member, open the inlet and close the outlet and, in a second position, to close the inlet and open the outlet, the valve member being arranged to be biased to its said first position in use, the said valve member constituting the movable armature of a solenoid and means being provided for intermittently energizing the solenoid coil for predetermined period to move the valve member to its said second position.

Preferably, such an apparatus is arranged to be powered by one or more dry batteries.

DESCRIPTION OF THE PREFERRED EMBODIMENT

Figure 1:
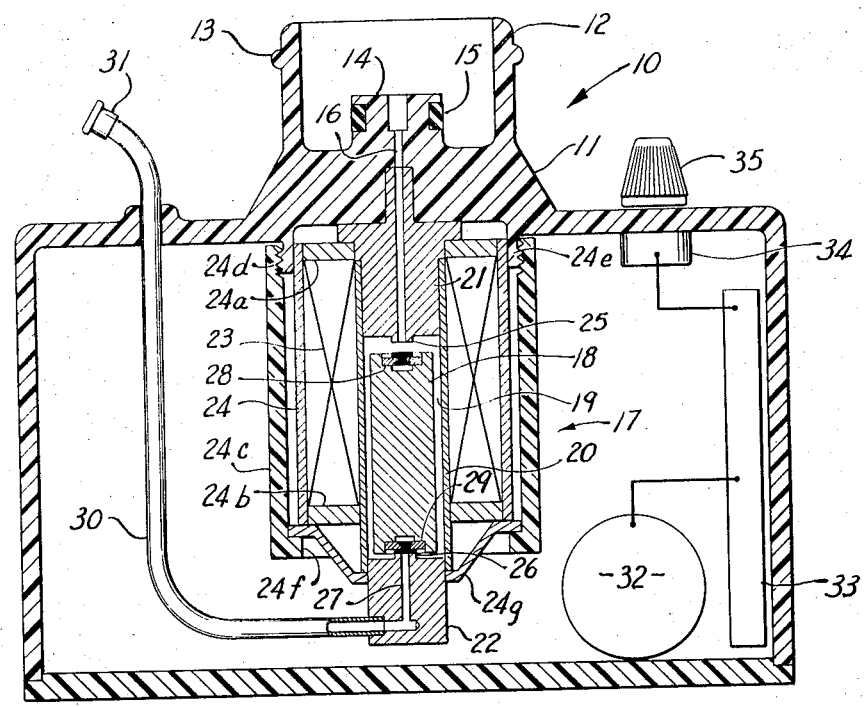
FIG. 1 shows a diagrammatic vertical section through the aerosol dispenser.

The dispenser 10 comprises a housing 11, preferably of plastic, the top side of which carries an upstanding socket 12 around which the top of an aerosol can (not shown), when inverted, may engage by virtue of a peripheral bead 13. A boss 14 within the socket 12 engages and is adapted to open the valve of the aerosol can, a seal 15 cooperating with the can and preventing the escape of fluid. A conduit 16 passes from the boss 14 into a valve assembly 17 through which the pressurized fluid is to be dispensed.

The valve assembly 17 comprises a valve member in the form of a steel cylindrical piston 18 which is a loose fit within a cylindrical chamber 19 provided by a brass cylinder 20. The ends of the chamber 19 are provided with end plugs 21, 22 which are suitably affixed in the cylinder 20. The cylinder 20 is surrounded by a solenoid coil 23 housed within an outer steel case 24 including steel end washers 24a, 24b. The piston 18 constitutes the solenoid armature.

The solenoid coil 23, case 24 and washers 24a, 24b are held in assembly within the housing by means of a plastic sleeve 24c which at one end is threaded, as at 24d, to an annular internal flange 24e. At its other end, the sleeve 24c has an internal flange 24f which engages the outer periphery of a retainer washer 24g which engages at its inner periphery the adjacent end of the cylinder 20.

The conduit 16 communicates with chamber 19 in the cylinder 20 via an aperture or passage which is circumscribed by a protruding valve seat 25 in the plug 21. A similar oppositely disposed, protruding valve seat 26 is provided in the lower plug 22 and circumscribes a discharge passage 27. The piston 18 carries resilient valve head elements 28, 29 in its upper and lower faces, respectively, for alternately engaging the valve seats, and thereby form an upper and a lower valve. Passage 27 in the plug 22 leads from the lower valve seat 26 to a tube 30 which passes out of the housing 11 and carries a spray nozzle 31.

The valve assembly, thus far described, will be recognized as a dispensing valve of the type which allows the inflow of a measured quantity of pressurized fluid from an aerosol can, through the passage 16, into the chamber 19 when the valve head 28 is off of its seat, as shown, and the valve head 29 is on its seat. The volume of liquid is determined by the difference between the volume of the chamber 19 and the volume of the piston or armature 18. When the piston or armature 18 is shifted to its alternate position, opening valve seat 26 and closing valve seat 25, the pressurized fluid will be discharged to the atmosphere through conduit 30 and nozzle 31.

Preferably, timing means are provided to cyclically energize the solenoid coil 23 to effect such shifting of the piston or armature 18, momentarily, to the dispensing position. At all other times, the pressure of fluid in the chamber will hold the piston or armature in the position shown. The mass of the piston assures contact between the valve head 29 and the seat 26. In the illustrative application of the valve, the means for cyclically energizing the solenoid coil 23 in enclosed within the housing 11.

Within the housing 11 is a suitable battery 32 for energizing the solenoid coil 23 and a timing circuit 33 preferably comprising a printed circuit board for controlling the connection from the battery 32 to the coil 23, is also enclosed in the housing 11. The timing circuit 33 includes a variable resistor 34 controlled by knob 35 on the housing for varying the interval between successive actuations of the coil 23. The printed circuit board without requiring further illustration, may advantageously comprise a typical capacitor-resistor timing circuit (not shown) which is charged by the battery 32, and the discharge cycle of which is varied by the potentiometer or variable resistor 34, whereby the solenoid coil is periodically instantaneously energized to shift the armature 18.

Figure 2:
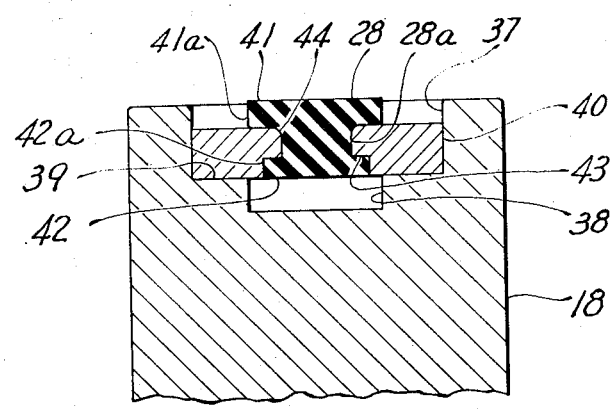
FIG. 2 shows, in detail, a representative valve of the dispenser.

The upper valve, which is identical in construction to the lower valve, is illustrated in part in more detail in FIG. 2. The piston 18 includes a circular socket 37 in its upper face. The floor of the socket 37 includes a further depression 38 so that a shoulder 39 is formed. The sealing element 28 is of limited thickness normal to the sealing face, and is in the form of a disc, preferably of a Freon resistant elastomeric material or pressurized fluid resistant polymer or rubber material supported around its periphery by brass ring 40. The rubber sealing element 28 is preferably molded onto the brass ring so that the sealing face 41 which seats on the valve seat 25 and inner face 42 of the sealing element disc 28 are on opposite sides of the inner periphery of the ring 40. The sealing face 41 of the sealing element 28 is situated above the upper side of the ring 40 on a disc section 41a, but the inner face on an inner disc section 42a is continuous with the lower side of the ring or otherwise spaced from the bottom of the cavity 38, the inner edge of the ring 40 being undercut at 43 on its lower side to receive the outer periphery of the disc section 42a and allow the ring 40 to hold the sealing element with a central necked portion 28a disposed in a central opening in the support ring 40.

The inner edge of the support ring 40 is bevelled at 44 or otherwise formed on its upper side to prevent shearing or damaging of the rubber sealing element 28 when contacting the valve seat. The brass ring 40 engages with the shoulder 39 of the socket 37 by means of a force fit to thereby mount the sealing element 28 in the upper face of the piston 18.

The operation of the aerosol dispenser will now be described. An aerosol can of, for example, insecticide or air freshener is mounted on the socket 12.

When so mounted on the socket 12, the outlet of the can is automatically opened and fluid from the can which includes Freon, passes through conduit 16. As the solenoid coil 23 is not normally energized the piston 18 is in its lower position and the lower valve is closed as the sealing element 29 is seated on valve seat 26. Thus, the fluid flows, under pressure, from conduit 16 out of the upper valve via the aperture in valve seat 25 and into the space within chamber 19 surrounding piston 18.

After a predetermined interval of time controlled by the variable resistor 34, the timing circuit connects the battery 32 with the solenoid coil 23. This causes the piston 18 to lift which closes the upper valve and opens the lower valve. As the fluid within the chamber 19 is under pressure, it flows out of the lower valve through the aperture 27 in lower valve seat 29 and tube 30 to discharge via nozzle 31.

It will be appreciated that as the upper valve is closed during discharge, a metered quantity of fluid (i.e., the volume of the space around piston 18) is discharged. The solenoid coil 23 is then disconnected from the battery and falls under gravity, assisted by the fluid pressure, to close the lower valve and open the upper valve. The cycle is repeated at the end of the set time interval.

It can be seen that for the device to operate most efficiently, it is necessary to allow the piston 18 the smallest possible movement between valve seats. This means that the swelling of the rubber sealing elements must be minimized across their sealing faces since excessive swelling would cause both valves to be closed simultaneously, rendering the device inoperative.

As has been discussed above, the present construction of sealing element and the method of support have been designed to minimize the problem of swelling. Thus, most of the surfaces of the rubber sealing element are free to swell, for example, the back face 42 can swell into depression 38 and thus, the swelling is not transmitted to the free sealing face. By mounting the sealing element in a ring, it is supported around its periphery so that swelling of the sealing face due to the clamping action of the ring is minimized. Also by making the sealing element in the form of a relatively thin disc, the amount of swelling is reduced. This has the added advantage that the volume of fluid in the chamber is not significantly reduced by the swelling of the rubber sealing elements.

The valve head, furthermore, is so constructed that the elastomeric seal 28 is free to flow under seating pressure, thus, assuring a better seal.

I claim:

1. A valve construction comprising a valve seat providing an annular projection circumscribing a flow passage, and a valve head engageable with said seat, said valve head including a body having a cylindrical cavity extending axially at one end, a support ring in said cavity having a central opening aligned with said valve seat, an elastomeric valve element having a necked portion disposed in said central opening, a valve disc formed on said neck portion and extending outwardly into overlying relation to said support ring, another disc formed on said necked portion and extending into underlying relation to said support ring, and another reduced cavity extending in said end of said body beneath said latter disc and coaxial with the first-mentioned cavity to allow deformation of said valve element into said another cavity.

2. A valve construction as defined in claim 1, wherein said support ring is removably disposed in said first-mentioned cavity, said body having an annular seat between said cavities on which said support ring seats.

3. A valve construction as defined in claim 1, wherein said support ring is constructed at its outer side about said central opening to prevent shearing of said elastomeric valve element upon engagement with said seat.

4. A valve construction as defined in claim 3, wherein said support ring is bevelled at its outer side about said central opening.

* * * * *